Oct. 10, 1967 P. L. GLOCKER 3,345,883
GEARING AND PROCESS AND APPARATUS FOR MANUFACTURING THE SAME
Filed Aug. 20, 1964 4 Sheets-Sheet 1

Inventor
Paul Leo Glocker
by Michael J. Striker

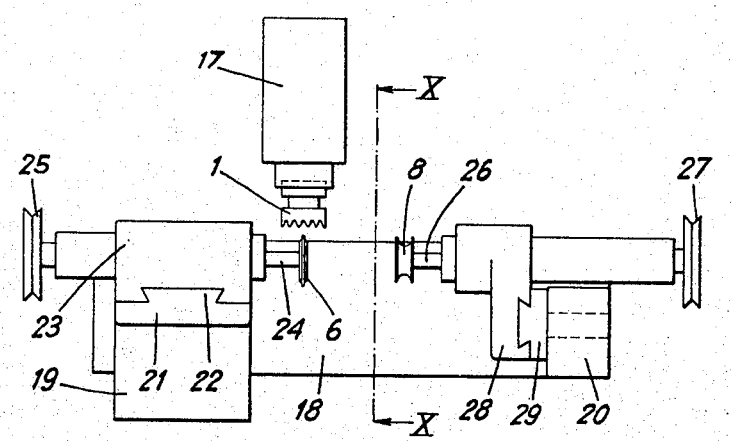
FIG.7
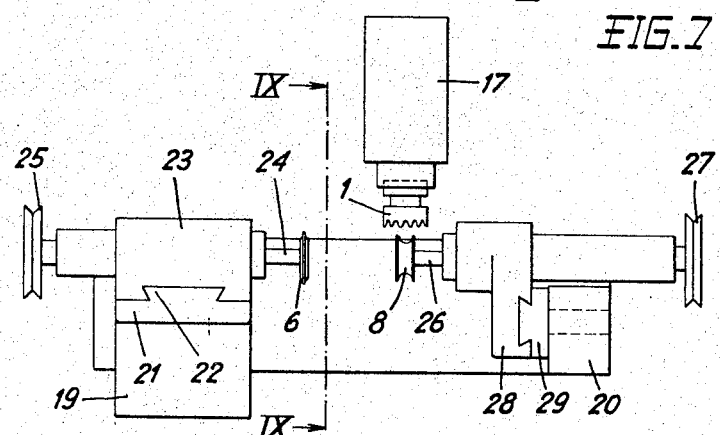
FIG.8
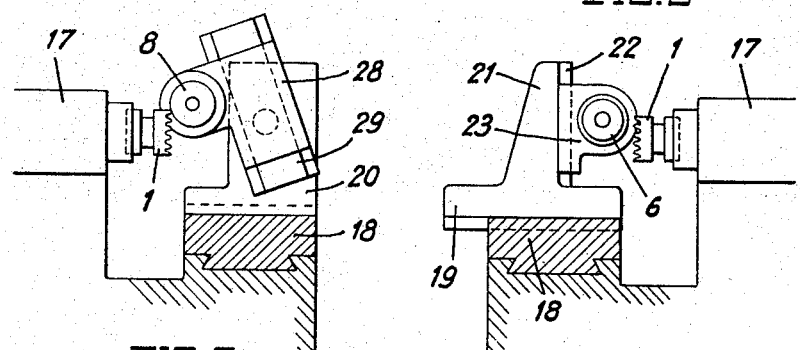
FIG.9
FIG.10

United States Patent Office 3,345,883
Patented Oct. 10, 1967

3,345,883
GEARING AND PROCESS AND APPARATUS
FOR MANUFACTURING THE SAME
Paul Leo Glocker, Jurastrasse 74, Grenchen,
Solothurn, Switzerland
Filed Aug. 20, 1964, Ser. No. 390,932
Claims priority, application Switzerland, Aug. 23, 1963,
10,395/63, 10,396/63
9 Claims. (Cl. 74—462)

The present invention relates to gears in general, and in particular to gears which are intended for use in mechanical devices requiring precise transmissions.

For example, the gear of the present invention can be used in watch movements particularly where a pair of meshing gears respectively have axes which are at an angle to each other so that a transmission similar to that of a pair of bevel gears is provided. Such transmissions are encountered, in watch movements, at the place where the drive is transmitted between the clutch wheel and the setting wheel for the minute wheel, as well as between the winding pinion and the crown wheel. At the present time, conventional gears are used in these transmissions, and the teeth of these gears are of a cycloidal profile or of a profile resulting from the development of a circle.

The conventional transmission of this type has the advantages of occupying a small space and to be simple to manufacture. However, proper meshing between the gears cannot be obtained. In practice it is difficult to adjust the depth of engagement between the teeth of the meshing gears simultaneously both in horizontal and vertical directions because of the manufacturing tolerances which must be accepted. If the depth of engagement is not sufficiently great, then there is the risk of fortuitous disengagement of the gears while if the depth of engagement is too great then there is the risk of blocking of the transmission by jamming of the gears.

In conventional gears of the above type the faces of the teeth include surface portions which form elements of a cylinder which in a plane perpendicular to its axis is not circular and these elements are parallel to the axis of the gear in the case of spur gears whose teeth extend radially with respect to the gear axis or perpendicular to a plane which includes the gear axis in the case of gears which have gear teeth extending parallel to the axis of the gear. A pair of gears of the above type as conventionally constructed have meshing teeth which, when the axes of the gears are at an angle to each other, respectively engage each other along lines of contact.

It is a primary object of the present invention to provide a gear, as well as a process and machine for manufacturing same, which can be used in transmissions of the above type but which will avoid all of the above drawbacks.

In particular it is an object of the invention to provide a gear, as well as a process and machine for manufacturing the same, which can mesh with a second gear of conventional construction whose axis is at an angle to the gear of the invention, without any risk of jamming or disengagement while at the same time permitting the relative positions between the gears to vary within certain limits.

It is furthermore an object of the present invention to provide a gear, as well as a process and apparatus for manufacturing the same, which will permit the above-referred to variations in the relative position between a gear of the invention and a conventional gear to take the place both radially and axially.

Moreover, it is an object of the present invention to provide a gear which can be very simply and inexpensively manufactured according to the process and apparatus of the invention from a conventional gear blank.

Furthermore, it is an object of the invention to provide a process and machine which are simple and economical permitting the gear of the invention to be manufactured with steps and structures which hardly increase the cost as compared to conventional processes and apparatus.

With the above objects in view the invention includes a first gear which is adapted to mesh with a second gear whose axis is inclined to the axis of the first gear, this first gear having gear teeth each of which is provided with a pair of opposed face portions at least part of which intersect a plane normal to the axis of the first gear and a cylinder coaxial with the first gear along lines which converge in a predetermined direction, these lines in the case of the plane converging away from the axis of the gear. The process of the invention includes the steps of first cutting the gear teeth of the first gear in a manner providing them with a conventional configuration and then cutting these teeth in the region of their tips at opposed faces with a rotary cutting tool providing these opposed faces with the portions which intersect the above plane and cylinder in the manner referred to above, the rotary cutting tool having a concave cutting surface which simultaneously machines opposed face portions of a pair of adjoining gear teeth. Finally, the machine of the invention includes three carrier means for respectively carrying the work and a pair of cutting tools, and a support means which supports two of the carrier means for movement relative to the third along a path enabling the cutting tools to be successively placed in engagement with the work.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 7 is a schematic top plan view of a machine according to the invention for manufacturing the gear of the invention according to the process of the invention;

FIG. 8 is a schematic top plan view showing the structure of FIG. 7 in a different position;

FIG. 9 is a schematic sectional elevation taken along the line IX—IX of FIG. 8 in the direction of the arrows;

FIG. 10 is a schematic sectional elevation taken along the line X—X of FIG. 7 in the direction of the arrows;

Figure 1:
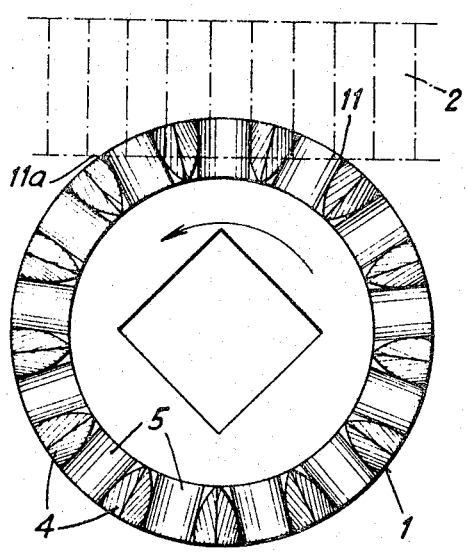
FIG. 1 is an end view of one possible embodiment of a gear according to the invention.

Referring now to FIGS. 1–4, the gear 1 which is shown in FIG. 1 is adapted to mesh with a conventional gear 2 whose axis is at an angle to the axis of the gear 1. The particular gear shown in FIG. 1 is a clutch wheel of a watch movement, this gear having axial teeth adapted to mesh with the setting wheel 2 whose teeth are of a conventional cycloidal profile. The clutch wheel 1 has the usual clutch teeth 3 and the axially extending gear teeth 4 the faces of which are divided into two surface portions. In order to manufacture these teeth 4 a gear blank of generally cylindrical configuration is initially machined so as to be provided with conventional gear teeth which adjoin each other in the regions of the roots of the teeth at radial groove portions 5 of the configuration of half a cylinder uniformly distributed about the axis of the blank. This step of the process is carried out by means of a circular milling cutter 6 which has cutting teeth 7 of the profile indicated in FIG. 3 so as to cut these radial grooves 5 and so as to provide the teeth with the conventional cycloidal configuration indicated in FIG. 3, the diameter of the cutter 6 being considerably greater than that of the gear blank and the axis of the cutter 6 being perpendicular to a plane which includes the axis of the gear blank and which passes midway between the pair of adjoining teeth between which the cutting teeth 7 are situated.

The teeth 4 are then machined to their final configuration during a second step of the process by means of a rotary milling cutter 8 (FIG. 4) having cutting teeth of arcuate, concave profile.

Figure 3:
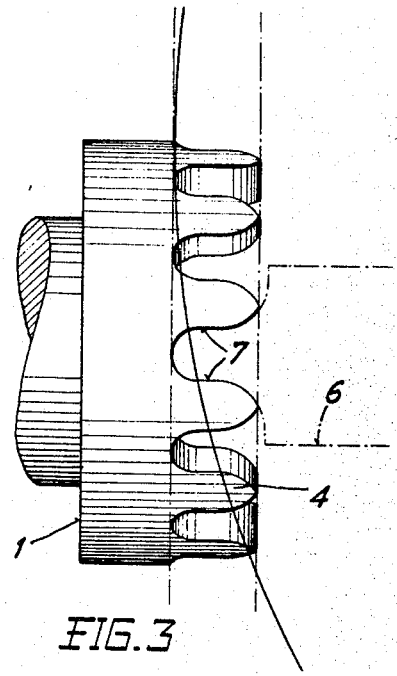
FIG. 3 is a fragmentary top plan view illustrating one of the steps in the manufacture of a gear according to the invention.
Figure 4:
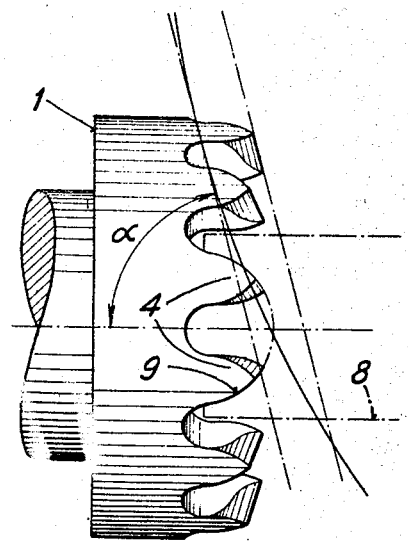
FIG. 4 is a fragmentary top plan view illustrating a step of the process of the invention subsequent to that illustrated in FIG. 3.

The axis of the cutter 8 extends parallel to the axis of the cutter 6 of FIG. 3. However, the axis of the cutter 8 is situated at a greater distance from the axis of the gear, than the axis of the cutter 6, in such a way that the edge of the cutter 8 describes a circle the tangent to which at the point where the cutter 8 engages the teeth 4 of the blank 1 forms with the axis of the blank an angle of in the neighborhood of but less than 90°. Inasmuch as the cutting teeth of the cutter 8 are concave, as shown in FIG. 4, the cutter 8 simultaneously machines opposed face portions of a pair of adjoining teeth 4 of the gear 1. The cutter 8 cuts parts of opposed faces of a pair of adjoining teeth so as to provide them with active surface portions 9 which, since the diameter of the cutter 8 is much greater than that of the blank 1, can be referred to as portions of cylinders which are not circular, in a plane perpendicular to the axis of the cylinder, and which are composed of cylinder elements which are in planes parallel to the faces of the cutter 8 and extending obliquely in the direction of the axis of the blank 1. All of the teeth 4 are successively cut in this manner so that in the region of its tip each gear tooth has a pair of opposed faces provided with the surface portions 9 which intersect each other at the tip of each tooth along a line of intersection 10 (FIG. 2) which is itself oblique. The surface portions 9 are convex and they intersect a plane perpendicular to the axis of the gear 1 along a pair of traces, for each gear tooth, which converge toward each other in a direction extending radially away from the axis of the gear 1. On the other hand as is shown in FIGS. 2 and 4, the surfaces 9 of each tooth intersect a cylinder coaxial with the gear 1, such as the outer cylindrical face of the gear, along a pair of traces which converge in a direction extending away from the center of the gear.

Figure 2:
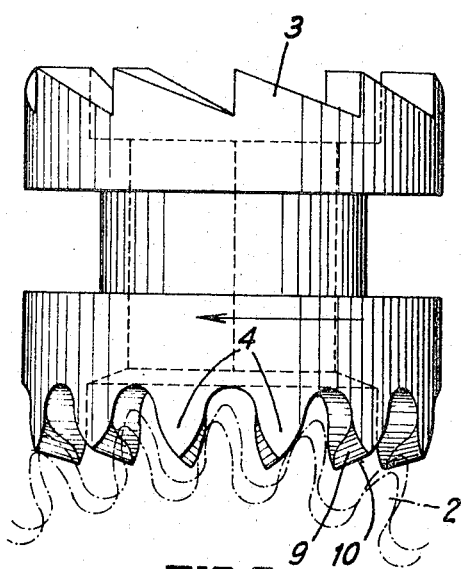
FIG. 2 is a top plan view of the structure of FIG. 1.

The setting wheel 2, indicate in dot-dash lines in FIGS. 1 and 2, is in mesh with the clutch wheel 1. This setting wheel or gear 2 has conventional radial cycloidal gear teeth. As a result of the particular configuration of the teeth 4, described above and shown in FIGS. 2 and 4, the radial and axial engagement of the gear 2 with the teeth 4 can vary within certain limits without any risk of jamming or premature disengagement inasmuch as the gear 1 drives the gear 2, each tooth 4 comes into contact with a tooth of the gear 2 at the point 11 indicated in FIG. 1. The driven tooth then slides on the convex face of the driving tooth until the latter reaches the point of disengagement 11a also indicated in FIG. 1. Friction and shocks between the teeth are reduced to a minimum because the teeth of the gear 1 and of the gear 2 contact each other at curved face portions thereof.

Figure 5:
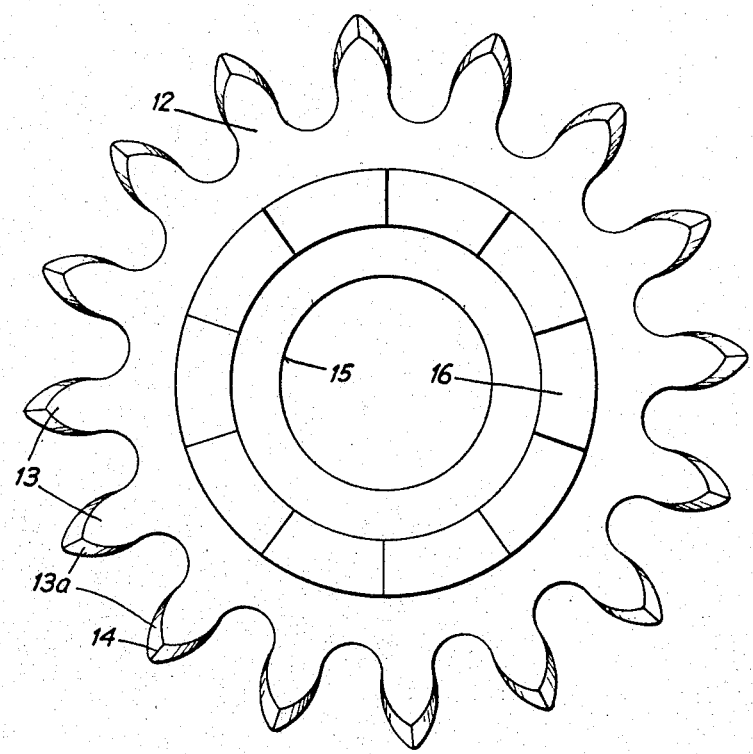
FIG. 5 is an end view of another embodiment of a gear according to the invention.
Figure 6:
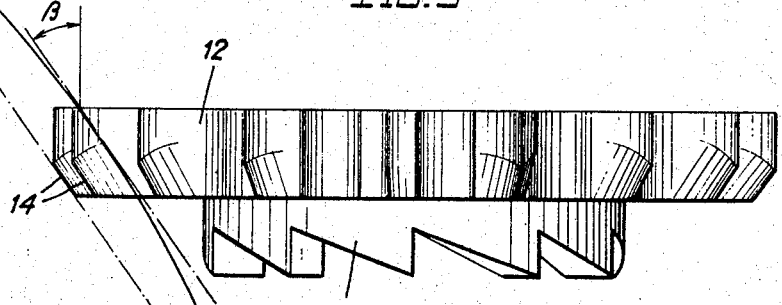
FIG. 6 is a top plan view of the structure of FIG. 5.

FIGS. 5 and 6 illustrate a pinion having radial teeth 13 with the faces of each tooth being each divided into a pair of surface portions in the same manner as the teeth 14. The active face portions 13a are in the form of arcuate surfaces. The teeth 13 of the pinion 12 are manufactured in two operations by means of cutters 6 and 8, as referred to above in connection with FIGS. 3 and 4. During the second step in the process of the invention, the cutter 8 cuts the teeth 13 so as to provide them with the surface portions 13a which are analogous to the surface portions 9, and these surface portions 13a of each tooth intersect along the oblique line 14 which forms the tip of each tooth. As is the case with conventional winding pinions used in watch movements, the pinion 12 is formed with a simple circular opening 15 and with clutch teeth 16 which are adapted to mesh with the clutch teeth 3 of the clutch wheel 1.

In order to manufacture the gears shown in FIGS. 1 and 5, according to the process of the invention which is illustrated in FIGS. 3 and 4, it is possible to use machines constructed according to the present invention and examples of which are illustrated in FIGS. 7–12. The machines of the invention include, as may be seen from FIG. 7, a work-carrying means 17 which forms a headstock having a horizontal axis by which the workpiece can be turned and equipped with an indexing device. The blank 1 is fixedly carried by a chuck of the headstock 17. In front of the unit 17 is situated a first carriage means 18 capable of shifting laterally, to the right and left as viewed in FIG. 7, so that the carriage means 18 moves transversely and in fact perpendicularly with respect to the rotary axis about which the work 1 can be turned. The first carriage means 18 carries a pair of second carriage means 19 and 20 which can be displaced perpendicularly with respect to the direction of movement of the carriage 18, so that the pair of second carriages 19 and 20 are slidable with respect to the first carriage 18 respectively in directions parallel to the axis of rotation of the work 1. A pair of third carriage means 23 and 28 are respectively carried by the second pair of carriage means 19 and 20 for movement perpendicularly to the directions of movement of the carriages 19 and 20, respectively, and also perpendicularly to the axis of the gear blank 1. Thus, as is shown most clearly in FIG. 10, the carriage 19 has an upwardly directed extension 21 provided with a dovetail slide 22 for the carriage 23, and this carriage 23 carries a tool-carrying means which carries the tool 6, this tool carrying means including a rotary spindle or shaft 24 to which the tool 6 is fixed for rotation with the shaft 24 at one end of the latter. A pulley 25 is carried by the opposite end of the spindle 24 so that the latter can be driven through any belt and pulley drive. The movements of the third carriage 23 on the slide 22 permits the cutter 6 to have its diameter adapted to the desired teeth. The carriages 18 and 19 are capable of being moved so as to place the cutter 6 in contact with the blank 1 in the position illustrated in FIG. 3.

The cutter 8 is carried by a tool-carrying means which includes the rotary shaft or spindle 26 which at its end distant from the cutter 8 is provided with a pulley 27 so that the spindle 26 and cutter 8 can be driven from any suitable belt and pulley drive. The second carriage means 20 also has a dovetail slide 29 for slidably supporting the third carriage means 28 which carries the shaft 26, but in this case the dovetail slide member 29 is pivotally connected to the second carriage means 20 for turning movement relative thereto about a horizontal axis extending parallel to the direction of movement of the first carriage means 18 so that the slide 20 can be angularly oriented with respect to the carriage means 18. This angular movement together with the slidability of the carriage 28 along the slide 29 enables the elevation of the cutter 8 to be adjusted. The working strokes of the cutter 8 are achieved simply by displacement of the carriage means 20 relative to the carriage means 18 in such a way that the axis of the cutter 8 is displaced horizontally.

Figure 11:
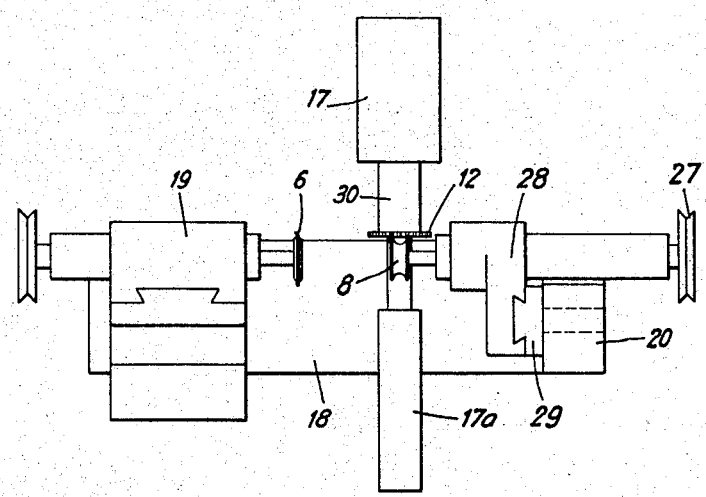
FIG. 11 is a schematic top plan view of another embodiment of the machine according to the invention.
Figure 12:
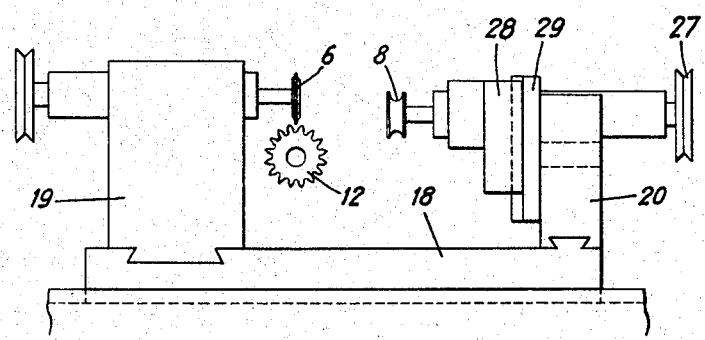
FIG. 12 is a schematic elevation of part of the structure of FIG. 11 showing the machine in a position different from that of FIG. 11.

The machine which is illustrated in FIG. 11 is composed of the same elements as the machine of FIGS. 7 and 10, the only difference being that the headstock 17 has a pair of portions 17 and 17a between which a removable arbor 30, which carries the work 12, is situated. This embodiment thus permits machining of radial teeth while the machine of FIG. 7 is intended for machining axial teeth. The machines described above permit a simple manufacture of small gears intended to mesh at an angle with the other gears in two operations as is the case with conventional gear teeth. The gears which are manufactured in this way, according to the invention, are capable of meshing at an angle with other gears which have conventional teeth and can, therefore, be simultaneously placed in mesh with a third gear of a gear train. On the other hand, the configuration of the faces of the gear teeth of the invention is such that they are capable of meshing with conventional gear teeth of a gear whose axis is perpendicular to the axis of the gear of the invention substantially without any shock or friction.

The assembling of the gears at angles with respect to each other presents no difficulty inasmuch as the tolerances of adjustment are very great and the possibility of fortuitous disengagement of the teeth is completely avoided.

The gears described above can be used not only in watch movements but also in a general way in precision mechanisms, for example, in computers, in control devices, in measuring instruments, and anywhere where it is necessary to provide a transmission between gears which are not situated in the same plane. The necessity of mounting several gears on a common shaft is avoided with the gear train which includes gears meshing at an angle and gears on parallel shafts which mesh with each other.

It will be understood that each of the elements described above, or two or more together, may also find a useful application in other types of transmissions differing from the types described above.

While the invention has been illustrated and described as embodied in gears and process of apparatus for manufacturing the same, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A first gear adapted to mesh with a second gear whose axis is at an angle to the axis of said first gear, said first gear having teeth and the flanks of each tooth of said first gear comprise two active surface portions which form each a part of a convex surface for revolution, said active surface portions of each tooth intersecting each other along an edge line located in a plane which contains the axis of said first gear, and said line extending obliquely inclined with respect to said first gear axis.

2. A first gear as defined in claim 1, wherein said teeth extend in radial direction and wherein the axes of said surfaces of revolution are perpendicular to said first gear axis.

3. A first gear as defined in claim 1, wherein said teeth extend in axial direction and wherein the axes of said surfaces of revolution are parallel to said first gear axis.

4. A first gear as defined in claim 1, wherein said surfaces of revolution are frusto-conical.

5. A first gear as defined in claim 1, wherein the axis of any one on said surfaces of revolution is equally remote from two adjacent teeth.

6. A first gear as defined in claim 1, wherein each flank of each tooth comprises, besides said active surface portion, a second active surface portion whose profile is that of a cycloid.

7. A first gear as defined in claim 1, wherein each flank of each tooth comprises, besides said active surface portions, a second active surface portion whose profile is that of a circle evolvent.

8. A first gear as defined in claim 6, wherein said active surface portions are non-circular cylindrical surface portions whose generatrices extend obliquely inclined with respect to said first gear axis.

9. A first gear as defined in claim 7, wherein said active surface portions are non-circular cylindrical surface portions whose generatrices extend obliquely inclined with respect to said first gear axis.

References Cited

UNITED STATES PATENTS

| | | | |
|---|---|---|---|
| 42,605 | 5/1864 | Skaats | 74—462 |
| 618,272 | 1/1899 | Johnson | 74—462 |
| 2,028,786 | 1/1936 | Lamatsch | 74—462 |
| 2,141,627 | 12/1937 | Street | 74—462 |
| 2,682,760 | 7/1954 | Shenk | 74—462 |
| 3,043,158 | 7/1962 | Herr | 74—462 |

FRED C. MATTERN, Jr., *Primary Examiner.*

DAVID J. WILLIAMOWSKY, *Examiner.*

C. J. HUSAR, *Assistant Examiner.*